United States Patent
Fang

(10) Patent No.: US 9,436,692 B1
(45) Date of Patent: Sep. 6, 2016

(54) LARGE SCALE VIDEO ANALYTICS ARCHITECTURE

(71) Applicant: EMC Corporation, Hopkinton, MA (US)

(72) Inventor: ChunSheng Fang, San Mateo, CA (US)

(73) Assignee: EMC Corporation, Hopkinton, MA (US)

( * ) Notice: Subject to any disclaimer, the term of this patent is extended or adjusted under 35 U.S.C. 154(b) by 237 days.

(21) Appl. No.: 13/926,130

(22) Filed: Jun. 25, 2013

(51) Int. Cl.
*G06F 7/00* (2006.01)
*G06F 17/30* (2006.01)

(52) U.S. Cl.
CPC ... *G06F 17/30076* (2013.01); *G06F 17/30194* (2013.01); *G06F 17/30864* (2013.01)

(58) Field of Classification Search
CPC ................................................ G06F 17/30864
USPC ....................................................... 707/705
See application file for complete search history.

(56) References Cited

U.S. PATENT DOCUMENTS

| | | | | |
|---|---|---|---|---|
| 5,930,379 A * | 7/1999 | Rehg | ............... | G06K 9/00342 345/473 |
| 5,983,220 A * | 11/1999 | Schmitt | ............. | G06F 17/30398 |
| 6,954,498 B1 * | 10/2005 | Lipton | ............... | G06K 9/00771 348/E5.058 |
| 8,543,596 B1 * | 9/2013 | Kostamaa | ......... | G06F 17/30194 707/770 |
| 2007/0013776 A1 * | 1/2007 | Venetianer | ......... | G06K 9/00771 348/143 |
| 2009/0171891 A1 * | 7/2009 | Nochimowski | ..... | G06F 17/3002 |
| 2010/0026802 A1 * | 2/2010 | Titus | ................ | G08B 13/19608 348/143 |
| 2014/0176708 A1 * | 6/2014 | Ramakrishnan | ... | G06K 9/00771 348/143 |

OTHER PUBLICATIONS

Yamamoto et al. ("Parallel Image Database Processing With Mapreduce and Performance Evaluation in Pseudo Distributed Mode"; International Journal of Electronic Commerce Studies vol. 3, No. 2, pp. 211-228, 2012).*
Tian et al. ("Event detection, query, and retrieval for video surveillance"; IBM T. J. Watson Research Center, 2009).*
Yamamoto et al. ("Parallel Image Database Processing With Mapreduce and Performance Evaluation in Pseudo Distributed Mode"; International Journal of Electronic Commerce Studies vol. 3, No. 2, pp. 211-228, 2012.*
Tian et al. ("Event detection, query, and retrieval for video surveillance"; IBM T. J. Watson Research Center, 2009.*
Stauffer et al., "Adaptive Background Mixture Models for Real-Time Tracking", 1999.
Author Unknown, "HStreaming Re-Invents Video Content Analysis for Big Data", Jun. 14, 2012.
Morgenthal, "Using Map/Reduce to Speed Analysis of Video Surveillance", Mar. 1, 2012.
Tian et al., "Event Detection, Query, and Retrieval for Video Surveillance", 2009.

* cited by examiner

*Primary Examiner* — Loan T Nguyen
(74) *Attorney, Agent, or Firm* — Van Pelt, Yi & James LLP

(57) ABSTRACT

A video file is split into a plurality of chunks. At least a subset of the chunks is processed in parallel, including by detecting one or more moving objects and computing for each detected moving object a visual key and an associated attribute value. The visual key and the associated attribute value are provided as output.

29 Claims, 10 Drawing Sheets

LARGE SCALE VIDEO ANALYTICS ARCHITECTURE

BACKGROUND OF THE INVENTION

Massive amounts of video data are generated on an ongoing basis, including from such sources as security cameras. Video content typically is encoded and stored in a standards-based video file format. File metadata provides rudimentary information about the file. The video content itself typically is unstructured. To locate content of interest in a video file, typically a user must review the raw video manually, and then manually tag the portions that are of interest and/or otherwise manually generate metadata or other structured data that identifies and/or describes content that is or may be of interest.

"Big data" platforms have been used to perform advanced data analytics processing with respect to massive amounts of structured and/or semi-structured data. However, as noted video content typically is stored as unstructured data in standards-based video file formats.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Systems and techniques to perform large scale video analytics are disclosed. In various embodiments, potentially very large amounts of video data (e.g., files and or streams that are gigabytes and/or terabytes in size) are loaded and processed in a parallel and distributed fashion. Standard video file formats may be automatically recognized and processed transparently. Customized analytics algorithms compute structured information through automated processing of unstructured video content. In various embodiments, a scalable architecture that can adapt to the increasing video size is provided. In various embodiments, an end user can obtain analytics results using standard Structured Query Language (SQL), e.g., ranging in various embodiments from simple object and trajectory queries to advanced aggregated statistics.

Figure 1:
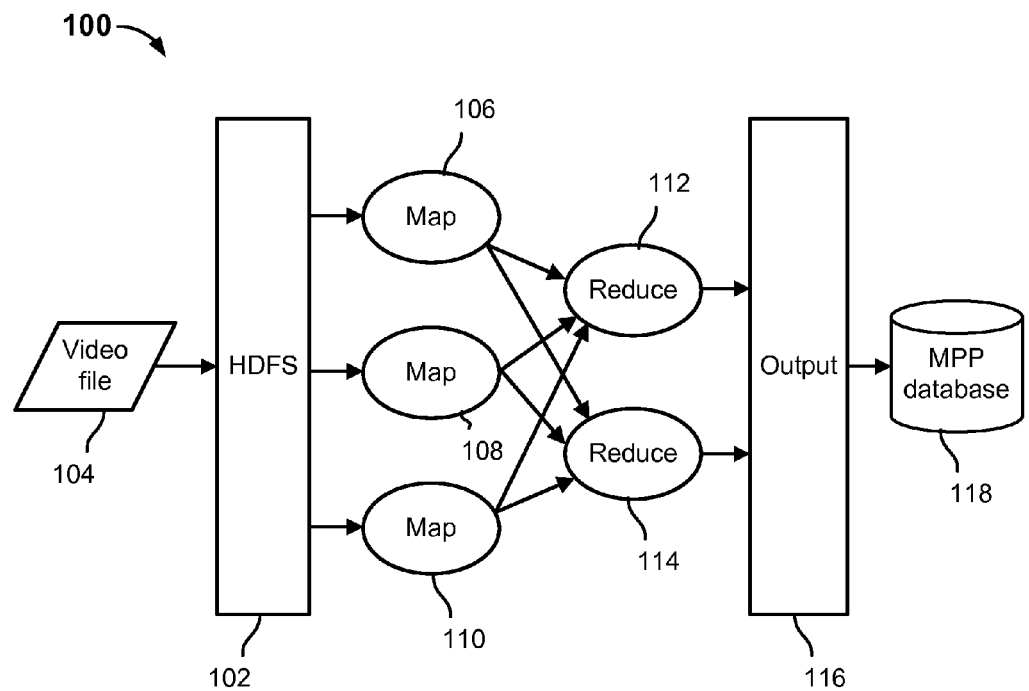
FIG. 1 is a block diagram illustrating an embodiment of a video analytics system.

FIG. 1 is a block diagram illustrating an embodiment of a video analytics system. In the example shown, the system 100 includes a distributed file system 102, in this example a Hadoop Distributed File System (HDFS) configured to recognize a file type of a received video file 104, e.g., in a standard video file format such as MPEG, AVI, H.264, etc.

In this example, distributed file system 102 performs distributed video transcoding (i.e., distributed file system 102 transcodes the video into a distributed file system-friendly format). For example, in some embodiments, a user uploads an MPEG or other video file 104 to the HDFS 102, which includes transcoder software that will split the file 104 into image frames, which may be throttled to key video frames only or full video frames, and converts them into Hadoop Sequence File format.

In addition to performing distributed video transcoding, distributed file system 102 in this example performs video analytics. For example, elements comprising a MapReduce architecture compute and store structured information based on the unstructured video data (i.e., image frames). In the example shown in FIG. 1, map elements 106, 108, and 110, for example, may for each video frame extract detected moving foreground objects, using known image processing algorithms, and for each detected object compute a visual key and coordinates of where the object is located within the image. For each detected moving object in each frame, the map element processing the frame, such as map elements 106, 108, and 110, generates and provides as output a composite key-value pair that includes the visual key, a timestamp that identifies the frame, and the coordinates.

For example, a visual key may include, without limitation, for each detected moving foreground object "k" in an image frame associated with a timestamp "t", a fingerprint representation of the object, computed based on the image content analysis, denoted as $f_{t,k}$. For each object, the object's location within the image, which in various embodiments may be further mapped to a geo-location, e.g., longitude and latitude, are identified via coordinates denoted as $c_{t,k}$. A composite key-value pair emitted by a map stage in this example may be denoted as $(f_{t,k}, (t, c_{t,k}))$, for example.

Referring further to FIG. 1, each of the map stages 106, 108, 110 sends output in the form of a composite key-value pair to respective reduce stages 112 and 114. For example, image frames in which the same moving object is detected and as a result the same detected object fingerprint is computed may be sent to a corresponding one of the reduce stages 112 and 114. In some embodiments, at the reduce stage (112, 114), data associated with each moving foreground object is collected, e.g., based on the fingerprint or other key, and based on a secondary sort on the timestamp "t" in the composite key-value pair $(f_{t,k}, (t, c_{t,k}))$ the trajectory of the object is formed. The reduce stages (112, 114) provide output to an output stage 116, which in turn stores in a massively parallel processing (MPP) and/or other database 118 (e.g., an EMC Greenplum® database) the trajectory and/or other structured information computed based on the unstructured video data received in the form of file 104.

Figure 2:
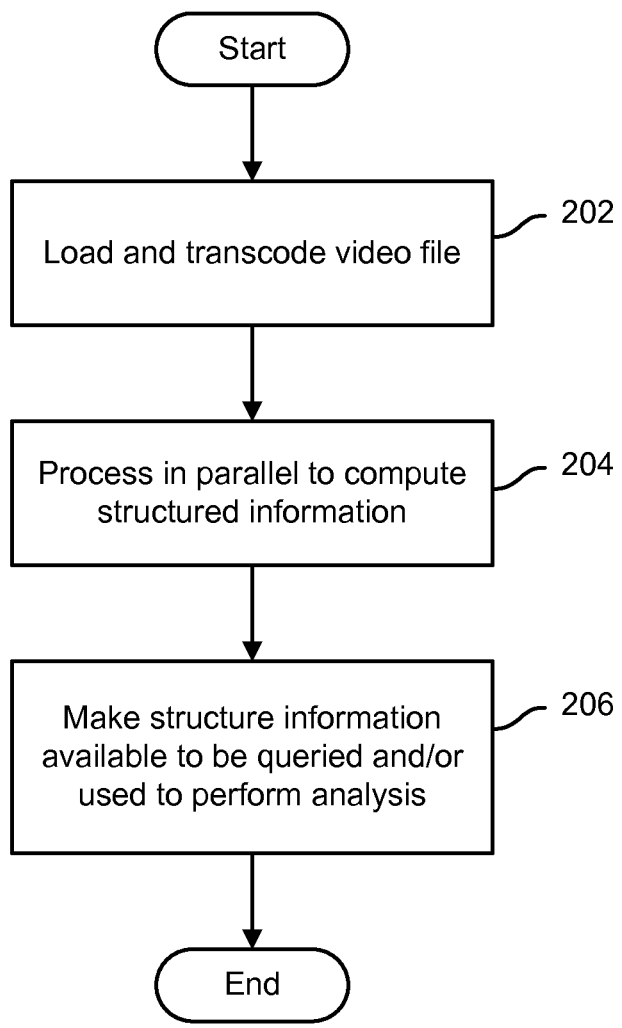
FIG. 2 is a flow chart illustrating an embodiment of a process to generate and store structured information from unstructured video.

FIG. 2 is a flow chart illustrating an embodiment of a process to generate and store structured information from unstructured video. In the example shown, a video file is loaded and transcoded (202). For example, as in FIG. 1, a video file may be loaded into distributed file system such as HDFS, split along image frame boundaries, and processed in parallel including by converting them into Hadoop Sequence File format. The respective image frames are processed in parallel to compute structured information based thereon (204). In the example described above in connection with FIG. 1, for example, known image processing techniques are used to detect moving foreground objects, and to compute trajectories for such objects as they move through a field of view. The structured information is made available to be retrieved, for example via SQL or other query, and/or to be used to perform data analytics processing (206).

In some embodiments, the structure information computed based on unstructured video data is stored in an MPP or other relational database. Based on indexes built in connection with storing the structured information in the database, the user can retrieve portions of video that may be of interest through SQL or similar querying tools.

For example, in the case of a large body of video data associated with one or more surveillance cameras, the retrieval task: "Find out how the blue car moved at the San Mateo parking lot, between 8 am and 12 pm on Sep. 4, 2013?" can be formulated as a SQL query into the index database as follows:

SELECT Location FROM SanMateoVideo
WHERE VisualKey="BlueCar"
AND Time>'2013-09-04-0800' AND Time<'2013-09-04-1200';

Note in the example above "BlueCar" is an object either defined by the user or identified and encoded by an implementation of an analytics algorithm from a large video archive, for example based on automated detection of the nature (car) and exterior color (blue) of a moving foreground object. In one example, the database schema is: (VisualKey, Location, Time)

Figure 3:
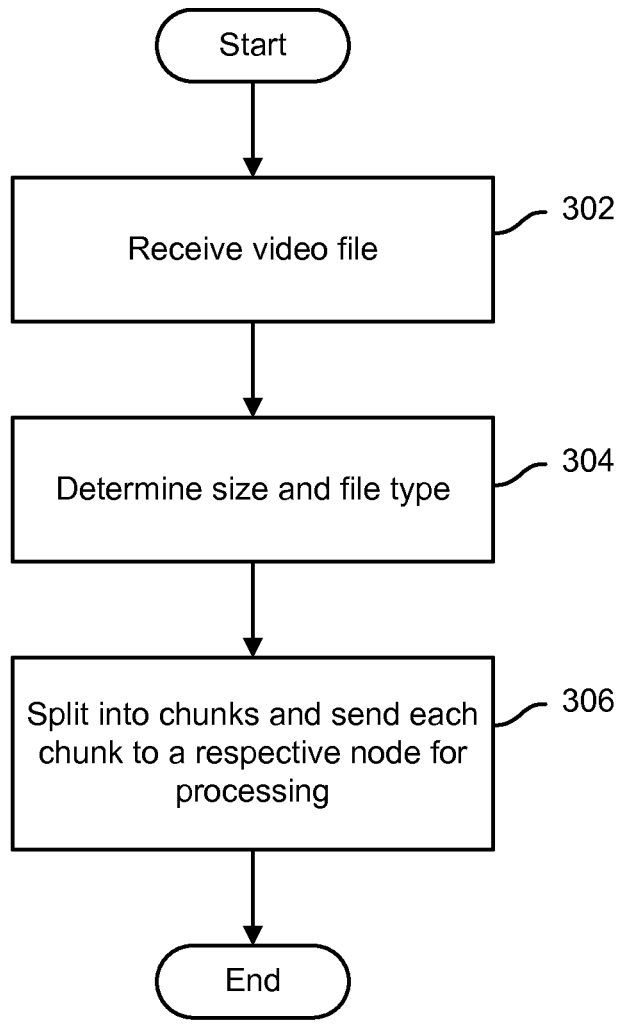
FIG. 3 is a flow chart illustrating an embodiment of a distributed video transcoding process to load and transcode a video file in a distributed file system (such as HDFS) into image frames in parallel.

FIG. 3 is a flow chart illustrating an embodiment of a distributed video transcoding process to load and transcode a video file in a distributed file system (such as HDFS) into image frames in parallel. In the example shown, a video file is received (302). The size and type of file are determined (304). For example, file metadata may be read by a process to determine the size, and the file suffix may be read by the process to determine the file type. The file is split into an appropriate number of chunks, for example each comprising 64 MB of video data, and the chunks are processed in parallel, e.g., each by one of a plurality of processing stages (306). In some embodiments, the processing includes inflating the video file data to generate image frames, and converting the image frames to Hadoop Sequence File format.

From the highest-level hierarchical abstraction, one MPEG file bit stream comprises of the video header and the video image frames. The video header is located at the beginning of the first chunk in the distributed file system and describes the overall summary of this video file such as width, height, color depth, decoder information, etc. The video image frames contribute the majority of the video content and (further) comprises of purity of GOP (Group of pictures) as in FIG. 4. In some embodiments, the video header is distributed among different chunks in order to help each video transcoder mapper function correctly decode the image frames. In some embodiments, such a mechanism has been implemented as a separate simple MapReduce Job, which only extracts the header information from the first chunk of the large video files, and shares it across different nodes such as "distributed cache" in Hadoop.

Figure 4:
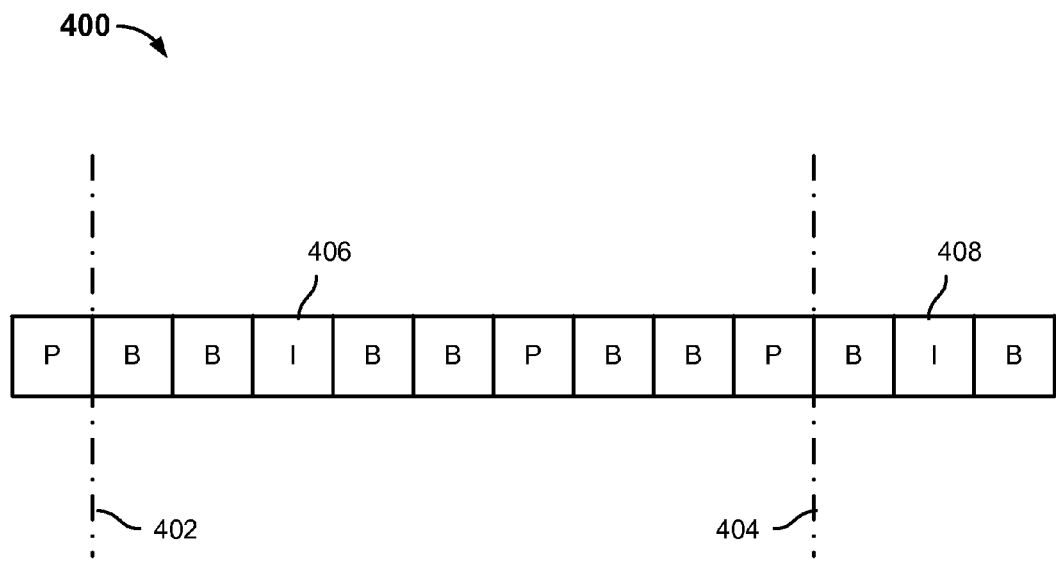
FIG. 4 is a block diagram illustrating an example of a portion of a video file.

FIG. 4 is a block diagram illustrating an example of a portion of a video file. In the example shown, the video file portion 400 includes a series of image frames according to the MPEG-2 standard format. Each "group of pictures" (GOP) includes an "I" frame, sometimes called an "intra" or "key" frame, which can be decompressed fully without reference to any other frame. A GOP may include one or more "P" or "predicted" frames, which reference the closest preceding I or P frame, and/or one or more "B" or "bi-directional" frames, which are encoded from an interpolation of succeeding and/or preceding I or P reference frames. In the example shown in FIG. 4, a first chunk boundary 402 and a second chunk boundary 404 are indicated. The I frame 406 is included in the chunk defined by the boundaries 402 and 404, and I frame 406 in this example marks the beginning of a group of picture (GOP). In some embodiments, a GOP header, not shown in FIG. 4, associated with the GOP with which I frame 406 is associated may be detected and read. In some embodiments, during the course of decoding each video chunk at each mapper, it may need to access a distributed cache to load the overall video header which has been extracted at previous stage.

As the example shown in FIG. 4 illustrates, chunk boundaries in some embodiments may not necessarily conform to GOP boundaries, resulting in some frames comprising a GOP being included in one chunk while other frames are included in a next chunk. In various embodiments, one or more techniques may be used to address such occurrences. For example, in some embodiments, the "B" frame shown just the right of chunk boundary 404 may be sent as needed from one processing node to another to reunite the frame(s) with the GOP with which it is associated. In other embodiments, such orphaned frames can be recovered by communicating among mappers which are already supported by Hadoop implementation. In the example shown in FIG. 4, for example, the B frame preceding I frame 408, if determined to be associated with a GOP such as the one with which I frame 406 is associated, may be redirected from a first processing stage to which the frame was first sent, along with I frame 408 and other frames in the same GOP as I frame 408, to a second processing stage associated with a GOP with which the B frame in question is associated, such as one associated with I frame 406. Note that while in FIG. 4 only approximately one GOP is included in a chunk, in a typical system in which a video file is split into 64 MB chunks each chunk typically would include a plurality of GOP's.

Figure 5:
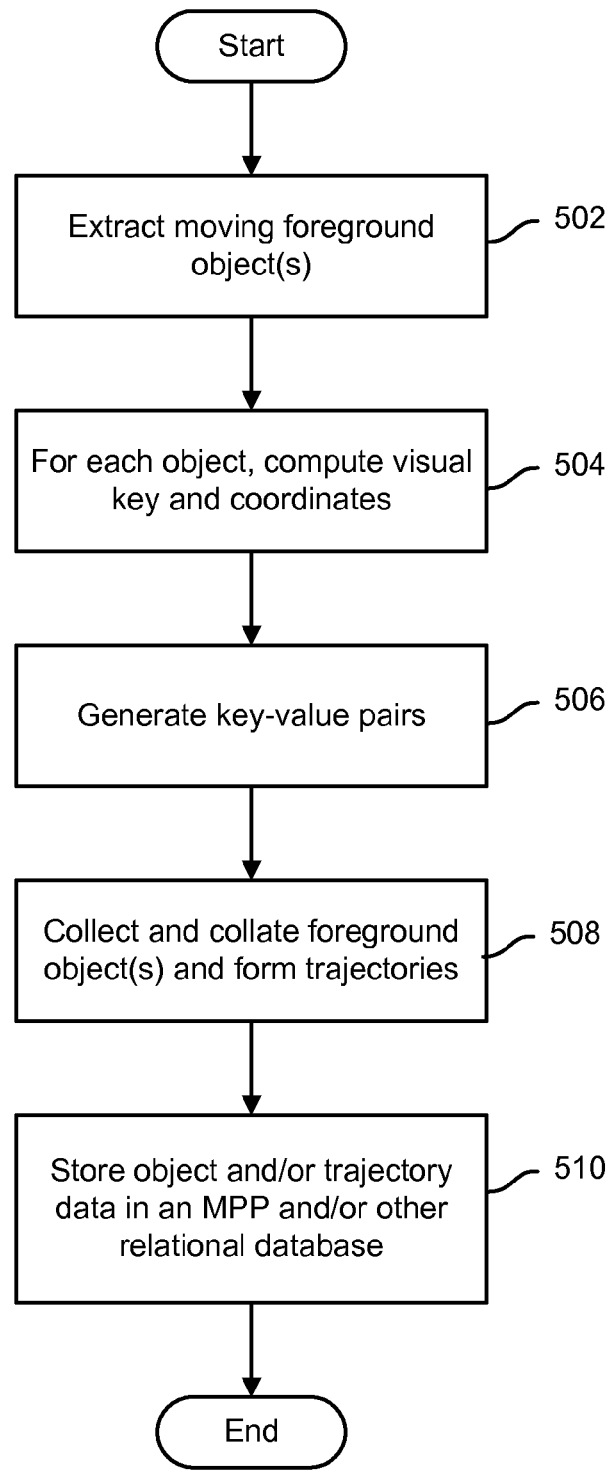
FIG. 5 is a flow chart illustrating an embodiment of a process to compute structured information based on unstructured video data.

FIG. 5 is a flow chart illustrating an embodiment of a process to compute structured information based on unstructured video data. In the example shown, moving foreground objects are detected (502). For each object detected, a visual key and coordinates are computed (504). For example, a set of one or more characteristic features may be extracted from the video data, and a representation of the extracted feature set computed and used as a key. Coordinates may include a location of the object relative to a reference, e.g., within the field of view, and/or may be further mapped to geo-location coordinates, such as latitude/longitude. For each detected moving foreground objects, a composite key-value pair is generated (506). For each detected foreground object, associated key-value pairs are collected and used to compute trajectories and/or other information derived from the key-value pairs and/or associated timestamps (508). Computed information (object key, coordinates, trajectory, etc.) is stored in a structured form, e.g., in an MPP or other database (510).

Figure 6:
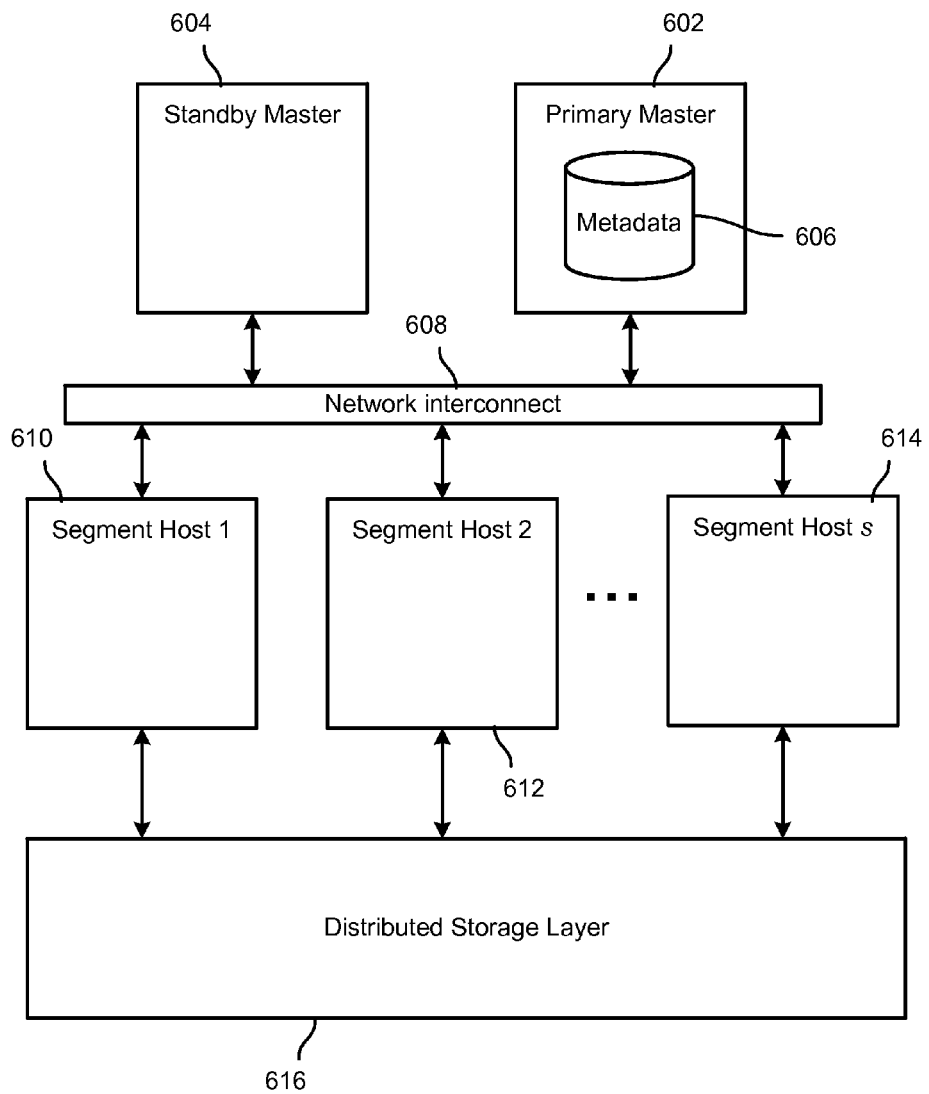
FIG. 6 is a block diagram illustrating an embodiment of a large scale distributed database system.

FIG. 6 is a block diagram illustrating an embodiment of a large scale distributed database system. In the example shown, the large scale distributed system comprises a massively parallel processing (MPP) database system with a distributed storage layer. The MPP database system includes a primary master 602 and a standby master 604. The primary master 602 is responsible for accepting queries; planning queries, e.g., based at least in part on system metadata 606, which in various embodiments includes information indicating where data is stored within the system; dispatching queries to segments for execution; and collecting the results from segments. The standby master 604 is a warm backup of the primary master 602. The network interconnect 608 is used to communicate tuples between execution processes. The compute unit of the database engine is called a "segment". Each of a large number of segment hosts, represented in FIG. 6 by hosts 610, 612, and 614, can have multiple segments. The segments on segment hosts 610, 612, 614, for example, are configured to execute tasks assigned by the primary master 602, such as to perform assigned portions of a query plan with respect to data stored in distributed storage layer 616, e.g., a Hadoop® or other storage layer. In various embodiments, structured data computed based on video content data as disclosed herein may be stored in one or more database tables on a MPP database system such as the one shown in FIG. 6. For example, index data comprising and/or derived from structured data as disclosed herein may in various embodiments be stored in metadata 606, enabling primary master 602 to receive and process queries against the structured data stored in the MPP database of FIG. 6, including in some embodiments by locating through such queries video content that may be of interest and/or performing advanced data analytics processing with respect to such structured data.

Figure 7:
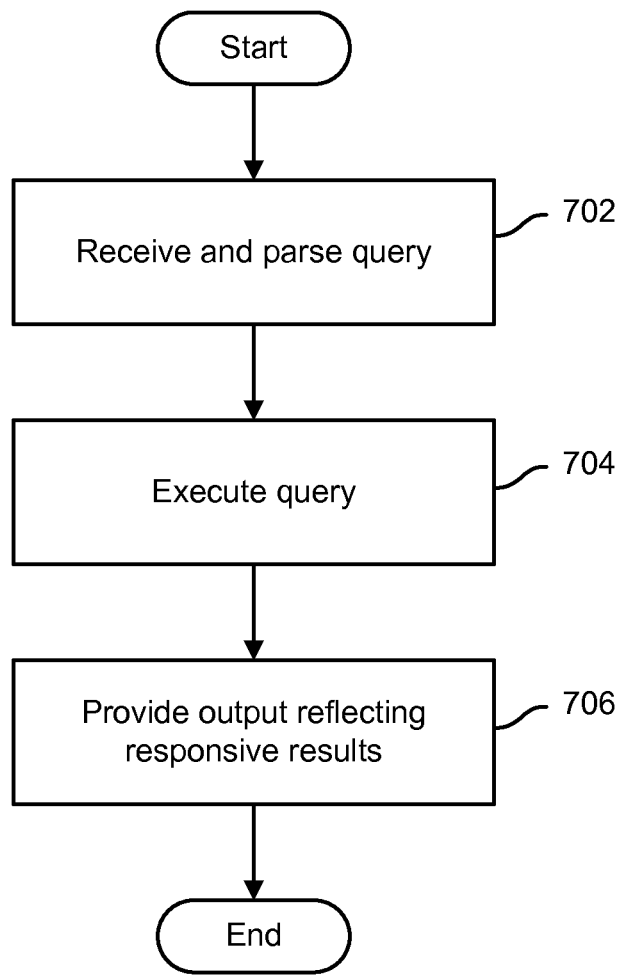
FIG. 7 is a flow chart illustrating an embodiment of a process to retrieve video data.

FIG. 7 is a flow chart illustrating an embodiment of a process to retrieve video data. In various embodiments, the process of FIG. 7 may be performed by and/or using an MPP or other database in which structured information computed based on unstructured video data has been stored. In the example shown, a SQL or other query is received and parsed (702). The query is executed (704). For example, a query plan is generated and used to cause each of a plurality of segments to search corresponding portions of one or more data tables for information responsive to the query. Results generated by the respective segments are received and aggregated and output reflecting the results is provided (706).

Figure 8:
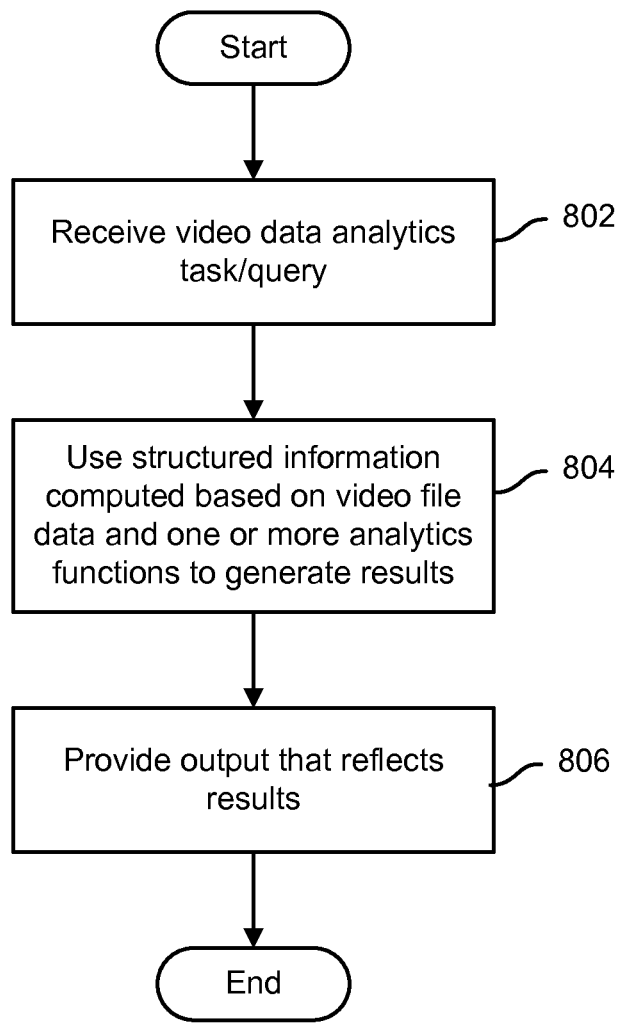
FIG. 8 is a flow chart illustrating an embodiment of a process to perform data analytics with respect to video data.

FIG. 8 is a flow chart illustrating an embodiment of a process to perform data analytics with respect to video data. In the example shown, a video data analytics task (e.g., query) is received (802). Structured information computed based on unstructured video data, as disclosed herein, is used, along with one or more data analytics functions, to generate responsive results (804). Examples of data analytics functions include, without limitation, statistical functions. Output that reflects the data analytics processing is provided (806).

For example, in some embodiments the analytics task: "Find out the average speed of the blue car in the San Mateo parking lot, from 8 am to 12 pm yesterday?" may be formulated as a SQL query with window function (a type of advanced SQL language feature) into the index database as follows:

SELECT sqrt(power(avg(abs(x_diff)),2)+
power(avg(abs(y_diff)),2))*FPS_FACTOR
FROM (
  SELECT
  X-lag(X,1) OVER (ORDER BY TIME) AS x_diff,
  Y-lag(Y,1) OVER (ORDER BY TIME) AS y_diff
  FROM SANMATEO
  WHERE TARGET="BlueCar"
  AND TIME>(CURRENT_TIMESTAMP-INTERVAL
    '1' DAY)
  AND TIME<(CURRENT_TIMESTAMP);)
) x_tmp;

Note, in the above example "BlueCar" is an object either defined by the user, or identified and encoded by the analytics algorithm implementation. FPS_FACTOR is a scene related constant that is calibrated beforehand. In various embodiments, the X, Y columns in the database table can be the center of mass of the image pixels of the detected moving object, or calibrated to geographical location such as latitude and/or longitude.

Figure 9:
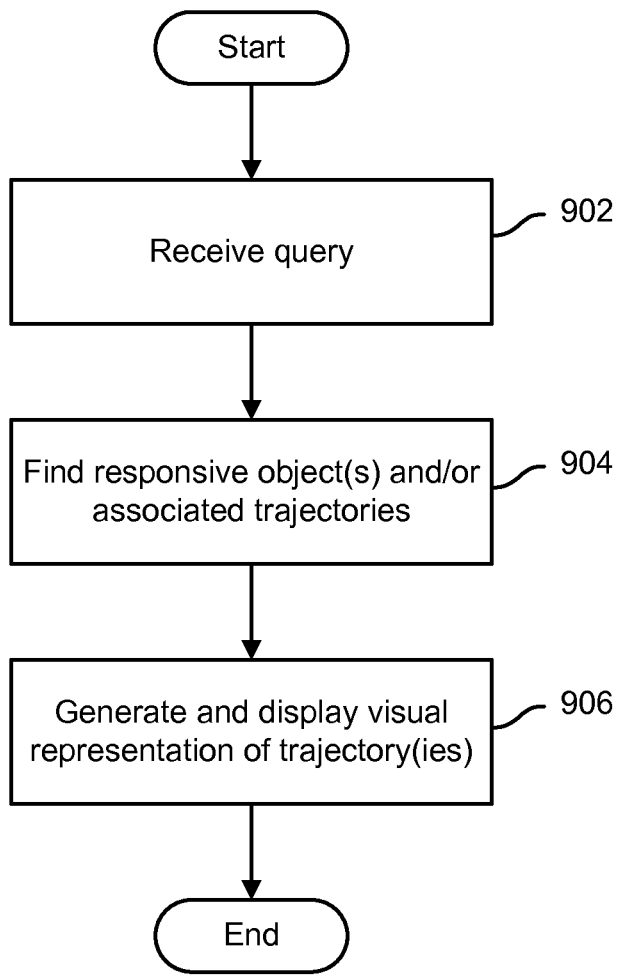
FIG. 9 is a flow chart illustrating an embodiment of a process to provide a visual representation of video data retrieval and/or analytics processing results.

FIG. 9 is a flow chart illustrating an embodiment of a process to provide a visual representation of video data retrieval and/or analytics processing results. In the example shown, a video data retrieval and/or analytics task is received (902), e.g., in the form of a SQL or other query. One or more responsive objects and/or associated trajectories is/are retrieved (904). For example, a query to find a specific car in the "San Mateo" parking lot, or all cars detected during a given time period, may have been received, and based on the query terms one or more responsive records may have been found in the database. A visual representation of a retrieved trajectory (in this example) is generated and displayed (906)

Figure 10:
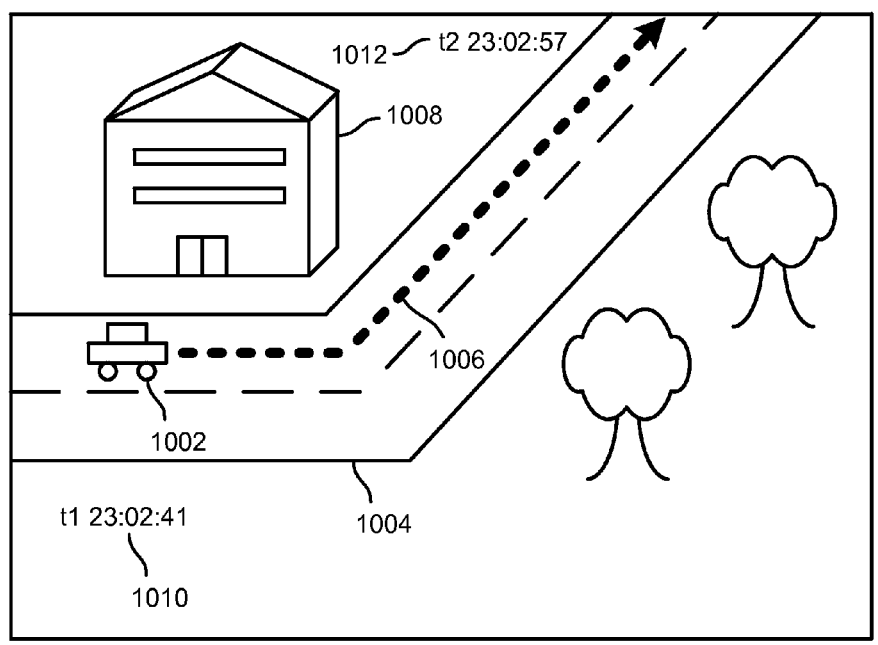
FIG. 10 is a block diagram illustrating an embodiment of a visual representation of moving object trajectory information.

FIG. 10 is a block diagram illustrating an embodiment of a visual representation of moving object trajectory information. In the example shown, the display 1000 depicts a scene in which a moving object 1002, in this example a car, is shown to have traveled along a roadway 1004 following a trajectory indicated by dashed line 1006 in a direction indicated by an arrow head at the upper/right end of dash line 1006. In this example, a non-moving building 1008 in the background may be a business or other property that is monitored using a video surveillance camera that has captured video content that was processed as disclosed herein to detect the object 1002 and to extract and compute the trajectory information represented by line 1006. In the example shown in FIG. 10, timestamp information associated with the detected object and trajectory represented in the display 1000 by object 1002 and dashed line 1006 has been used to determine and include in display 1000 a start time 1010 and an end time 1012 indicating when the object (car) 1002 entered and exited, respectively, the field of view shown in the display 1000. In various embodiments, the display 1000 may be interactive (e.g., if equipped with high performance backend database such as Greeenplum MPP Database). For example, selection of the object 1002 may result in further computed and/or extracted structured information being retrieved and displayed, and/or displayed in another form, such as a table. In some embodiments, clicking on an object such as object 1002 may result in underlying raw video data being retrieved and displayed, for example to enable a user to view the video of the object 1002 driving through the scene depicted statically at first, as shown in FIG. 10.

Using techniques described herein, meaningful access to and/or use of large amounts of video data, such as that generated by surveillance cameras, may be provided, and advance data analytics enabled with respect to such vide data. In this way, the labor and other resources currently required to browse surveillance or other video clips can be reduced dramatically. Also, higher level analytics can be enabled, e.g. giving the traffic patterns in various different time frames every day, detecting anomalous behaviors in the surveillance scene (e.g., comparing actual speed of an object to an average or other learned baseline speed determined by computing the average speed of previously-observed objects), analyzing highway utilization over time to help optimize urban traffic, etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   splitting a video file into a plurality of chunks respectively comprising unstructured video data, wherein the splitting the video file into the plurality of chunks comprises in the event that a boundary corresponding to at least one of the plurality of chunks does not conform to a Group of Pictures boundary associated with a first Group of Pictures, sending a first subset of one or more frames corresponding to the first Group of Pictures to a processor that is to process a second subset of one or more frames corresponding to the first Group of Pictures;
   processing at least a subset of the chunks in parallel, including by detecting one or more moving objects and computing for each detected moving object a visual key and an associated attribute value, wherein the attribute value comprises one or more of a set of one or more coordinates indicating a geo-location corresponding to a location of the moving object in an image frame with which a key-value pair is associated and a timestamp associated with the image frame with which the key-value pair is associated;
   providing the visual key and the associated attribute value as output; and
   storing, in a database, the visual key and the associated attribute value as structured information in a searchable format.

2. The method of claim 1, wherein the video file comprises a standard video file format.

3. The method of claim 2, further comprising detecting the standard video file format.

4. The method of claim 3, further comprising transcoding the video file from the standard video file format to distributed file system-friendly format.

5. The method of claim 1, wherein each chunk is processed at least in part by a map stage to which the chunk is provided as input.

6. The method of claim 5, wherein the visual key and the associated attribute value are computed by the map stage and provided as output in the form of a composite key-value pair.

7. The method of claim 1, wherein the key-value pair is sent to a reduce stage determined based at least in part on the visual key.

8. The method of claim 7, wherein the reduce stage is configured to collect key-value pairs associated with a same moving object and to form and store a trajectory data based on the collected key-value pairs.

9. The method of claim 1, further comprising using the visual key and associated attribute value to compute and store structured information associated with at least a portion of the video file.

10. The method of claim 9, wherein the structured information, optional with a thumbnail image for future reference, is stored in a database.

11. The method of claim 10, further comprising using an index associated with the structured information as stored in the database to retrieve at least a portion of said structured information from the database in response to a database query.

12. The method of claim 11, wherein the query comprises a SQL query.

13. The method of claim 10, wherein the database includes an advanced data analytics capability and further comprising using the advanced data analytics capability to perform advanced data analytics processing with respect to at least a portion of the structured information.

14. The method of claim 9, further comprising providing a visual representation of at least a defined subset of said structured information.

15. The method of claim 14, wherein the structured information comprises a trajectory of the moving object and the visual representation comprises a visual representation of the trajectory.

16. The method of claim 15, wherein the trajectory is represented as a line or one or more other graphical elements arranged in the visual representation to indicate the trajectory of the moving object with respect to a static or other background or reference.

17. The method of claim 1, further comprising decoding, in parallel, one or more image frames from a plurality of localized distributed chunks in a Hadoop Distributed File System (HDFS).

18. The method of claim 1, wherein the processing of at least the subset of chunks and computing for each detected moving object the visual key and the associated attribute value comprises:
  associating each detected moving foreground object with an image frame, a timestamp associated with the image frame, and a fingerprint representation of the corresponding moving foreground object.

19. The method of claim 18, wherein the fingerprint representation of the corresponding moving foreground object is computed based on an image content analysis.

20. The method of claim 1, wherein the database is searchable using natural-language queries.

21. The method of claim 1, further comprising:
  receiving a query from a client;
  querying the database based at least in part on the query;
  in the event that the database includes data that is responsive to the query, providing the client with a query result, the query result including an image displaying an object corresponding to the query result; and
  in response to receiving a input from the client, the input corresponding to a selection of the query result, retrieving corresponding underlying raw video data of the object corresponding to the query result.

22. A system, comprising:
  a processor; and
  a memory coupled with the processor, wherein the memory is configured to provide the processor with instructions which when executed cause the processor to:
    split a video file into a plurality of chunks respectively comprising unstructured video data, wherein to split the video file into the plurality of chunks comprises in the event that a boundary corresponding to at least one of the plurality of chunks does not conform to a Group of Pictures boundary associated with a first Group of Pictures, sending a first subset of one or more frames corresponding to the first Group of Pictures to a processor that is to process a second subset of one or more frames corresponding to the first Group of Pictures;
    process at least a subset of the chunks in parallel, including by detecting one or more moving objects and computing for each detected moving object a visual key and an associated attribute value, wherein the attribute value comprises one or more of a set of one or more coordinates indicating a geo-location corresponding to a location of the moving object in an image frame with which a key-value pair is associated and a timestamp associated with the image frame with which the key-value pair is associated;
    provide the visual key and the associated attribute value as output; and
    store, in a database, the visual key and the associated attribute value as structured information in a searchable format.

23. The system of claim 22, wherein:
  the video file comprises a standard video file format; and
  the memory is further configured to provide the processor with instructions which when executed cause the processor to:
    detect the standard video file format; and
    transcode the video file from the standard video file format to distributed file system-friendly format.

24. The system of claim 22, wherein:
  each chunk is processed at least in part by a map stage to which the chunk is provided as input; and
  the visual key and the associated attribute value are computed by the map stage and provided as output in the form of a composite key-value pair.

25. The system of claim 22, wherein the memory is further configured to provide the processor with instructions which when executed cause the processor to decode, in parallel, one or more image frames from a plurality of localized distributed chunks in a Hadoop Distributed File System (HDFS).

26. A computer program product, the computer program product being embodied in a non-transitory tangible computer readable storage medium and comprising computer instructions for:
  splitting a video file into a plurality of chunks respectively comprising unstructured video data, wherein the splitting the video file into the plurality of chunks comprises in the event that a boundary corresponding to at least one of the plurality of chunks does not conform to a Group of Pictures boundary associated with a first Group of Pictures, sending a first subset of one or more frames corresponding to the first Group of Pictures to a processor that is to process a second subset of one or more frames corresponding to the first Group of Pictures;
  processing at least a subset of the chunks in parallel, including by detecting one or more moving objects and computing for each detected moving object a visual key and an associated attribute value, wherein the attribute value comprises one or more of a set of one or more coordinates indicating a geo-location corresponding to a location of the moving object in an image frame with which a key-value pair is associated and a timestamp associated with the image frame with which the key-value pair is associated;
  providing the visual key and the associated attribute value as output; and
  store, in a database, the visual key and the associated attribute value as structured information in a searchable format.

27. The computer program product of claim 26, further comprising computer instructions for using the visual key and associated attribute value to compute and store structured information associated with at least a portion of the video file.

28. The computer program product of claim 27, wherein the structured information, optional with a thumbnail image for future reference, is stored in a database.

29. The computer program product of claim 27, further comprising computer instructions for providing a visual representation of at least a defined subset of said structured information, wherein the structured information comprises a trajectory of the moving object and the visual representation comprises a visual representation of the trajectory.

\* \* \* \* \*